Dec. 29, 1942. T. KIKUYAMA 2,306,544
DRIVING MECHANISM
Filed May 7, 1940 2 Sheets-Sheet 1
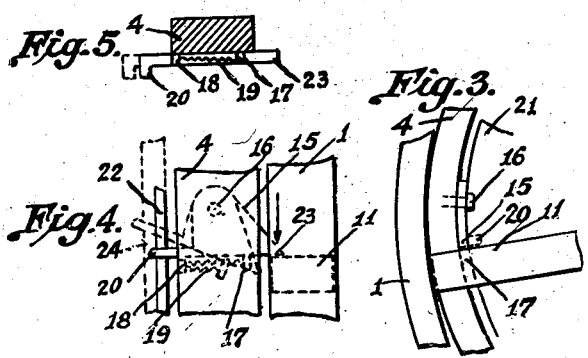
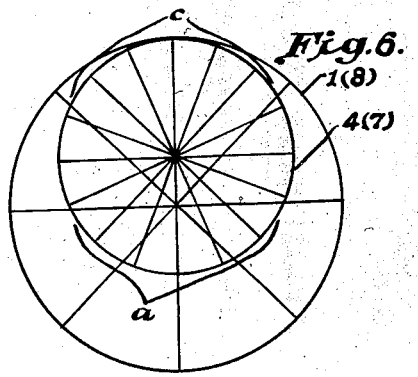
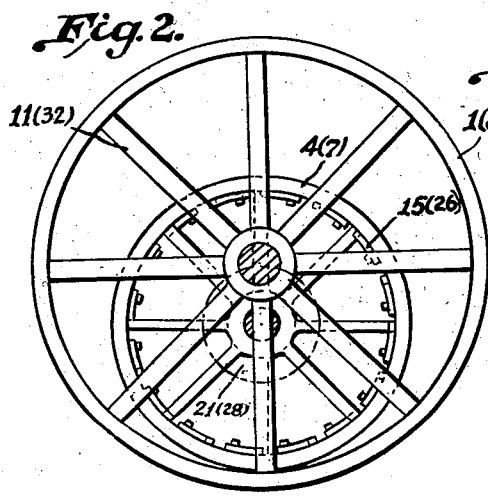
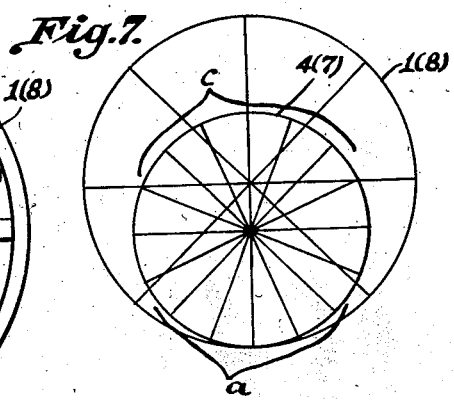
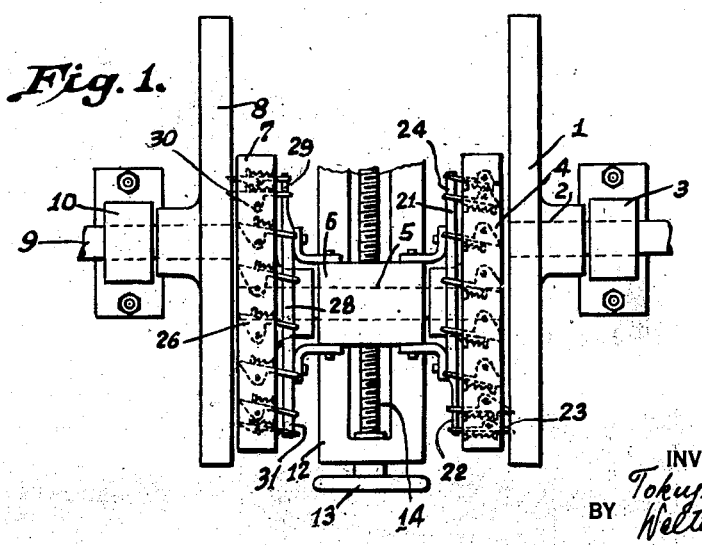
INVENTOR
Tokuji Kikuyama
BY Walter S. Herton
ATTORNEY Dec. 29, 1942.  T. KIKUYAMA  2,306,544
DRIVING MECHANISM
Filed May 7, 1940  2 Sheets-Sheet 2
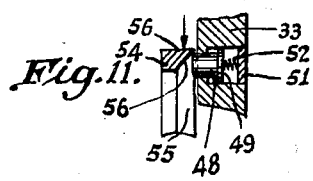
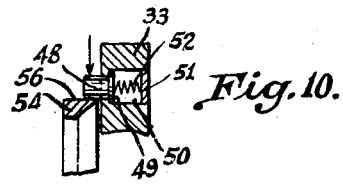
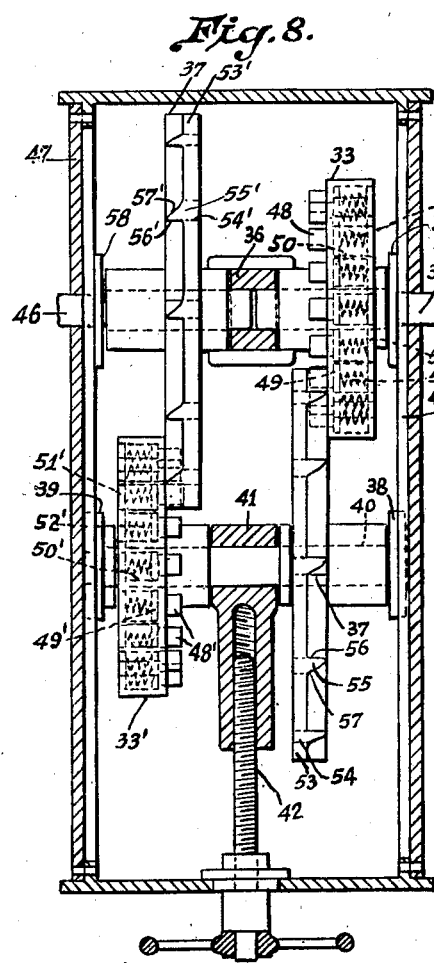
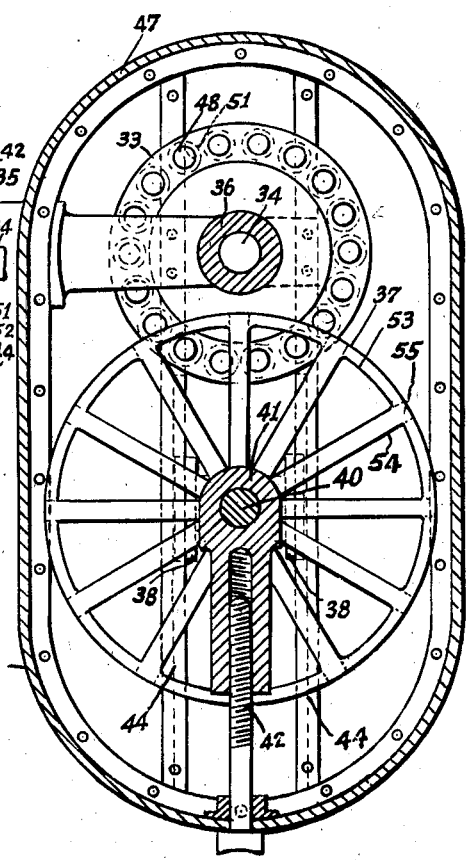
INVENTOR
Tokuji Kikuyama
BY Walter S. Pleston
ATTORNEY Patented Dec. 29, 1942

2,306,544

UNITED STATES PATENT OFFICE 2,306,544

DRIVING MECHANISM

Tokuji Kikuyama, Yanagihara-cho, Higashi-Ku, Magoya-Shi, Japan; vested in the Alien Property Custodian Application May 7, 1940, Serial No. 333,778
In Japan May 9, 1939

7 Claims. (Cl. 74—415)

The invention relates to a driving mechanism or transmission, by which power is transmitted from a driving to a driven wheel. The invention is useful for drives with a constant ratio of transmission and is of particular advantage if employed in a change speed gear.

Well-known mechanisms of the type to which this invention relates have various disadvantages, the chief examples of which are the loss due to slipping in the case of friction drives, the idle motion during the shifting of speed in the case of devices for regulating speed by gears, and the imperfect function due to the leakage of liquid in the case of hydraulic drives.

The invention aims to avoid the mentioned drawbacks and contemplates to provide a device which will transmit motion and permit changing of speed smoothly and reliably and without slipping. The invention essentially consists in the combination of two wheels facing each other and rotatable about parallel axes, one of the wheels being provided with a plurality of ledge-like abutments extending in radial direction and the other wheel being provided preferably on its rim, with a plurality of detents or tappets for engagement with or disengagement from said abutments depending on the wheel which tends to overrun the other one. The invention further consists in the provision of means for varying the spacing of the parallel wheel axes from each other whereby it is possible to shift the position at which the tappets engage the radially extending abutments. The invention also consists in means for causing the tappets on the rim of the second rotating wheel to occupy a position of disengagement at a certain fixed position whereby the driven wheel may be given an increase or decrease in the speed of rotation in accordance with the relative positions of the two wheels. Moreover, in addition to this characteristic, when a plurality of such pairs of wheels are arranged, a still greater amount of increase or decrease in the speed of rotation can be obtained than in the case in which only one pair of wheels is arranged. Moreover, since this increase or descrease in speed is brought about by means of the tappets on one wheel becoming engaged at any desired position of the many abutments extending radially on the other wheel, that is to say, at a point that can differ in radial distance from the center of the wheel, no slip will be produced in the transmission of mechanical power, and the increase and decrease of speed can be accomplished smoothly, reliably, and without step-by-step shifting. Therefore, when this mechanism is used as a speed regulating device in automobiles, cloth printing machinery, spinning machinery, and other types of machinery, the disadvantages of known devices of this type can be avoided.

The first rotating wheel and the second rotating wheel can become either driving or driven wheels as desired.

Other objects and advantages will be apparent from the following detailed description, taken in conjunction with the accompanying drawings, in which:

Fig. 1 shows a plan view of the first example,

Fig. 2 shows a side view of a part of Fig. 1,

Figs. 3, 4, and 5, show side, plan, and end, views of an abutment and tappet,

Figs. 6 and 7 are diagrams for explaining the manner of engagement and the relative position of the first and second rotating wheels, Fig. 8 shows a partial cross-section and plan view of the second example, Fig. 9 shows a cross-sectional view taken through the middle of Fig. 8, Figs. 10 and 11 are explanatory diagrams showing the conditions of engagement and disengagement of an abutment and tappet in the second example.

With reference to Figs. 1–7, the first rotating wheel 1 is a driving wheel, which drives the second rotating wheel 4. Fixed to the same shaft 5 as this second rotating wheel and revolving together with it, another second rotating wheel 7 is provided. Driven by the latter wheel 7 is another first rotating wheel 8, and by its shaft 9 the mechanical power is transmitted to the desired machine part. Wheel 1 has a shaft 2, which can be rotated by any desired driving power, and is supported by the bearing 3. The wheel 4 facing wheel 1 has fixed to it a shaft 5 and is supported by bearing 6, and on the other end of this shaft is fixed the wheel 7. The last driven wheel 8, facing wheel 7, has fixed to it a shaft 9 and is supported by bearing 10. The first rotating wheel 1 has a number of abutments 15 extending radially from the hub and which in the illustrated example are integral with or constitute the spokes of the wheel. The bearing 6 supporting the shaft of wheels 4 and 7 can be moved over base 12 with respect to the first rotating wheels 1 and 8, by means of screw 14, which may be turned by means such as a hand wheel 13, so that it can be shifted upward and downward in Fig. 1. On the inside of the rim of the second rotating wheel 4, detents or tappets 15 are hinged by means of pivots 16, and each of the tappets is provided with a compression spring 19 held between the projection 17 of the tappet and the projection 18 on the rim of wheel 4, so to cause the tappet projection 23 to protrude from the edge of the rim of wheel 4 and engage with an abutment 11 of wheel 1. A hook 20 is provided on the end opposite to the tappet projection 23, and by engaging this hook with the guide ring 21, which is fixed to bearing 6, the tappet 15 is free to swing in the clockwise direction but is prevented from swinging in the opposite direction.

If it is assumed for the time being that wheel 1 is the driving wheel and rotates in the direction from the bottom of Fig. 1 towards the reader and upward, and that the guide ring 21 has the width of the portion 22 over its entire circumference, whereby the tappet projections 23 will all protrude so as to engage the abutments 11 as shown in the lower right-hand part of the drawing (Fig. 1) and if, furthermore, wheel 4 is situated opposite to the lower part of wheel 1 as shown in Figs. 1 and 2, then the tappet projections 23 can contact the various abutments 11 at different points having different radii from the center of driving wheel 1. Therefore, that tappet projection 23 whose point of engagement with one of the abutments 11 at a time is farthest from the center of wheel 1 and, consequently, has the greatest peripheral velocity will be taken along by the abutment while the other tappet projections will rotate and pass ahead of other abutments at points whose peripheral velocities and distances from the center of wheel 1 are smaller than those of the first-mentioned tappet. This is possible because a tappet projection 23 in passing one of the abutments 11 will engage the latter with its slanting edge. Thereby, a force is set up on the tappet projection in the direction of the arrow of Fig. 4 and the tappet is turned about its pivot 16 against the restraint of its spring 19. Thus, the abutment 11 engaging a tappet projection at the point of maximum peripheral velocity will cause the wheel 4 to rotate at approximately this peripheral velocity. Since the center of the driven wheel 4 is situated between the center of the driving wheel 1 and the point of engagement, the angular velocity of the driven wheel 4 is greater than the angular velocity of the driving wheel 1, and thereby the speed of revolution of the driven wheel can be increased. In this manner, by shifting the driven wheel with respect to the driving wheel and by properly selecting the sizes of these wheels, it is possible to change the speed within predetermined limits. Fixed to the same shaft 5 as wheel 4, another second rotating wheel 7 is provided, and on its rim, detents or tappets with projections 30 of the same type as those of wheel 4, are arranged so, however, that they face in the direction opposite to those on wheel 4, that is to say, so that a wheel 8 similar to wheel 1 may be rotated by means of wheel 7. On wheel 8, abutments are arranged in the same manner as on wheel 1. The guide ring 21 cooperating with wheel 4 is shaped to cause the tappet projections 23 to operate effectively only along one portion 22 (the range $a$ in Figs. 6 and 7) and remain in a position of disengagement along the other portion 24. The guide ring 28 coordinate to wheel 7 is shaped to cause the tappet projections 30 to operate effectively only along one portion 29 (the range $b$ in Figs. 6 and 7) and to remain in a position of disengagement along the other portion 31. Moreover, a phase difference, for example, of 180°, may be provided between 22 and 29. When wheels 1 and 4 are in a position relative to each other, as shown in Figs. 1, 2, and 7, wheel 4 is increased in its speed of rotation, as explained above, whereby wheel 7 rotates with the same speed, that is to say, with the same angular velocity as the driven wheel 4 and since wheel 8 is rotated by means of the tappet projections 30 on the wheel 7, wheel 8 will be rotated at the velocity of the abutment engaged by the tappet projection 30 located at the shortest distance from the center of wheel 8, while the tappet projections 30 that are farther away from the center of wheel 8 are thrust on their slanting edges, and are passed by the abutments in the same manner as the tappets 15. Moreover, since in this case the center of wheel 8 is located between the center of wheel 7 and the point of engagement between abutment and tappet, the angular velocity of wheel 8 is increased, and hence the angular velocity is increased by an even greater amount than that obtained by using only the wheels 1 and 4. When wheels 1, 4, 7, and 8 are located as shown in Fig. 6, the angular velocity of wheel 4 will be decreased, since the center of wheel 1, contrary to the foregoing description, will be located between the center of wheel 4 and the point of engagement between abutment and tappet, and by means of wheel 7 rotating at the same speed as wheel 4, the wheel 8 will be rotated. Moreover, since the center of wheel 7 is located between the center of wheel 8 and the point of engagement between abutment and tappet, the angular velocity of wheel 8 will be still further decreased, thereby bringing about a greater ratio of decrease in speed than that obtained when only wheels 1 and 4 are arranged in this manner.

In the modification shown in Figs. 8–11, the second rotating wheel 33 is used as the driving wheel to drive the first rotating wheel 37 fixed to shaft 40. Another second rotating wheel 33' is mounted on the same shaft so as to rotate together with wheel 37. Another first rotating wheel 37' is driven by wheel 33', and by means of its shaft 46 the mechanical power is transmitted to the desired machine part. Wheel 33 has a shaft 34, which can be rotated by any desired driving power, and is supported by the bearings 35 and 36. The wheel 37 facing wheel 33 has fixed to it said shaft 40 and is supported by the bearing 38 and 39. The last driven wheel 37', facing wheel 33', has fixed to it said shaft 46 and is supported by the bearings 36 and 58. Wheel 33 has a number of tappet projections 48 arranged around its circumference. Each tappet projection 48 is held within a hole 50 in the circumference of the wheel by means of a flange 49 at the back of the tappet projection, and between this flange and the cover 51 of the hole, a compression spring 52 is held, which causes the tappet projection to protrude automatically in the direction parallel to the shaft of the wheel. The bearings 38 and 39 supporting the shaft of wheels 37 and 33' are held in the sliding grooves 44 and 45 in such a manner that they can be shifted towards and away from wheels 33 and 37' within such a range that the shaft 40 does not cause the rim of wheel 37 and 33' to pass beyond the shafts 34 and 46 respectively from the position shown in Fig. 8 in which they are below shafts 34 and 46. The bearings 38 and 39 can be moved by means of a screw 42 rotatable by means of a hand wheel 43 and attached to the frame 47 of the mechanism and the piece 41 which engages the shaft 40. The first rotating wheel 37 has a rim 53 and a number of spokes 54. Moreover, it is provided with abutments 55 extending radially along the side of the spokes 54 on the side facing the second revolving wheel 33. Each abutment 55 has a surface 56 parallel to the wheel axis for engaging with the tappet projections 48. The other face 57 opposite to face 56 is inclined so as to push a tappet projection 48 into the rim of the wheel 33 against its spring 52 when the projection 48 engages the incline during the operation of the device. Since the relation between wheel 33' and wheel 37' is exactly the same as the relation between wheels 33 and 37, the various similar parts have been indicated by the same numbers, with primes (') added, to keep their relationships clear.

If it is assumed that wheel 33 is rotated, as the driving wheel, in the direction from the bottom of Fig. 8 towards the reader and up, the tappet projections 48 can occupy different positions on the various abutments 55 of wheel 37, in other words, positions of different radii from the center of the driven wheel 37. Therefore the tappet projections 48 will engage the surfaces 56 of the abutments 55 at the point where the peripheral velocity of their positions at the various radii on wheel 37 is minimum, that is to say, the point closest to the center of wheel 37, and will rotate this wheel (Fig. 10). The other abutments contacting tappets on points having larger radii and, therefore, greater peripheral velocity than this minimum can pass ahead of the tappet projections 48 by thrusting against the tappet projections 48 with the disengaging surfaces (the slanting surfaces) 57 and pushing the tappet projections 48 into the rim of wheel 33 by compressing the springs 52 (Fig. 11). Therefore the tappet projections 48 on the driving wheel 33 rotating at a constant speed will engage with the abutments so as to impart the minimum peripheral velocity to the driven wheel 37 and will rotate the wheel 37 with approximately this velocity. As stated the position can be changed at which the tappet projections 48 of wheel 33 engage the abutments 55 of wheel 37, and rotate the wheel 37, which change is in accordance with the amount that the rim of wheel 37 can be shifted within such limits that it does not pass beyond the shaft 34 of wheel 33 as it is moved in the direction towards this shaft. Consequently a difference in the angular velocities, measured from the centers of wheels 37 and 33, can be produced in accordance with the distances from the point of engagement between tappet projections 48 and abutment 55 to the center of the driving wheel 33 and to the center of the driven wheel 37, and thus the speed of the driven wheel can be increased or decreased by means of the driving wheel. Therefor, by shifting the driven wheel with respect to the driving wheel and by properly selecting the ratio of the diameters of these wheels, it is possible to change the speed within predetermined limits. In this manner, when another first rotating wheel 37' is rotated by another second rotating wheel 33' which is fixed to the same shaft as the first rotating wheel 37 that has been increased or decreased in speed, the angular velocity of the last driven wheel 37' can be increased or decreased in speed by an even greater amount in accordance with the action described above.

In order that the operation of the mechanism may be smooth, the whole mechanism may be contained in oil.

While, for the purpose of illustration, I have shown and described a specific embodiment of my invention, it will be apparent to those skilled in the art that many changes and modifications may be made therein without departing from the true spirit thereof or from the scope of the appended claims.

I claim:

1. A driving mechanism comprising a first wheel rotatable about its axis and including a plurality of abutments radially extending substantially as spokes, a second wheel rotatable about another axis and facing said first wheel, the axes of the wheels being parallel to each other and so spaced that the wheels at least partly overlap each other, a plurality of tappets attached to said second wheel in circumferential arrangement, each tappet having an operative end position in which it protrudes in the path of said abutments, and having an inoperative position in which it is removed from said path, resilient means so arranged between each tappet and said second wheel as to urge the associated tappet into its operative position whereby a tappet engaging any one of said abutments will cause common rotation of the two wheels when the point of engagement of said abutment tends to overrun the engaging tappet in one direction, and said tappets and said abutments embodying cooperative means to urge any one of said tappets into inoperative position against the restraint of the associated resilient means when the point of engagement of an abutment with said tappet tends to overrun the engaging tappet in the opposite direction.

2. A driving mechanism comprising a first wheel rotatable about its axis and including a plurality of abutments radially extending substantially as spokes, a second wheel rotatable about another axis and facing said first wheel, the axes of the wheels being parallel to each other and so spaced that the wheels at least partly overlap each other, a plurality of tappets attached to said second wheel in circumferential arrangement, each tappet having an operative end position in which it protrudes in the path of said abutments, and having an inoperative position in which it is removed from said path, resilient means so arranged between each tappet and said second wheel as to urge the associated tappet into its operative position whereby a tappet engaging any one of said abutments will cause common rotation of the two wheels when the point of engagement of said abutment tends to overrun the engaging tappet in one direction, said tappets and said abutments embodying cooperative means to urge any one of said tappets into inoperative position against the restraint of the associated resilient means when the point of engagement of an abutment with said tappet tends to overrun the engaging tappet in the opposite direction, and means in connection with one of said wheels for varying the spacing of the two axes of the wheels.

3. A driving mechanism as claimed in claim 1 wherein each of said abutments has two faces extending in substantially radial direction, one of said faces being so shaped as to cooperate with an engaging tappet when its point of engagement tends to overrun the tappet in the one direction, and the other face being arranged at an angle with respect to a portion of a tappet engaging said second face when its point of engagement tends to overrun the engaging tappet in the opposite direction, whereby said tappet will be urged into its inoperative position.

4. A driving mechanism as claimed in claim 1 further comprising a stationary cam member coaxial with said second wheel and individual means in connection with said tappets and adapted to engage said cam member, said cam member being so shaped as to move and hold each tappet with the aid of said means in inoperative position during a portion of a revolution of said second wheel, and to release each tappet into operative position during the remainder of the revolution of said wheel.

5. A driving mechanism as claimed in claim 1 further comprising a third and a fourth wheel including abutments and tappets respectively and being substantially of the same type and relative arrangement as said first and said second wheel, said second wheel and one of the third and fourth wheels being connected for common rotation, and a first and a second stationary cam member coordinate to said second and said third wheels respectively, each of said cam members having an operative portion in relation to the tappets of the coordinate wheel whereby tappets engaging said operative portions during a revolution of the wheel are urged into their inoperative position, and the operative portion of the one cam member being so angularly displaced with respect to the operative portion of the second cam member that there is a difference in phase with respect to the ranges of operativeness of the tappets of said second wheel and of those of said third wheel.

6. A driving mechanism as claimed in claim 2 wherein said first wheel is the driving wheel, further comprising a third and a fourth wheel including tappets and abutments respectively and being substantially of the same type and relative arrangement as said second and said first wheel respectively, a common shaft on which said second and said third wheel are mounted for common rotation, and means for varying the spacing of said common shaft from the axes of said first and said fourth wheel.

7. A driving mechanism as claimed in claim 2 wherein said second wheel is the driving wheel, further comprising a third and a fourth wheel including tappets and abutments respectively and being substantially of the same type and relative arrangement as said second and said first wheel respectively, a common shaft on which said first and said third wheels are mounted for common rotation, and means for varying the spacing of said common shaft from the axes of said second and said fourth wheel.

T. KIKUYAMA.